Nov. 22, 1966   C. GAGNIERE   3,287,636
METHOD AND APPARATUS INCLUDING CONDENSER MEANS FOR MEASURING
THE INSULATION FROM EARTH OF ELECTRICAL NETWORKS
Filed July 19, 1963   2 Sheets-Sheet 1

Inventor:
Claude Gagniere
By
Attorney

Nov. 22, 1966  C. GAGNIERE  3,287,636
METHOD AND APPARATUS INCLUDING CONDENSER MEANS FOR MEASURING
THE INSULATION FROM EARTH OF ELECTRICAL NETWORKS
Filed July 19, 1963 2 Sheets-Sheet 2

Inventor:
Claude Gagniere
By
Kim W. Flocks
Attorney

United States Patent Office 3,287,636
Patented Nov. 22, 1966

3,287,636
METHOD AND APPARATUS INCLUDING CONDENSER MEANS FOR MEASURING THE INSULATION FROM EARTH OF ELECTRICAL NETWORKS
Claude Gagniere, Nogent-sur-Oise, France, assignor to Charbonnages de France, Paris, Seine, France, a public institution of France
Filed July 19, 1963, Ser. No. 296,244
Claims priority, application France, July 24, 1962, 904,906
8 Claims. (Cl. 324—54)

The present invention relates to an improved method and new apparatus for the measurement of the insulation of electrical networks, the indication of which is independent of the voltage fluctuation of the network and gives a faithful signal which can be transmitted to a distance.

Devices for the protection of alternating electrical networks against earth faults are already known, in which, in the event of a fault between one or more phases and earth, a polarized current is caused to appear in an electrical connection between the phases of the network and earth, this polarized current being detected in order to measure the insulation of the network with respect to earth, and to actuate, when so required, an alarm or the interruption of the network when the insulation resistance is insufficient.

Such systems have a great disadvantage which resides in that the indications of the insulation resistance and the thresholds of the tripping and alarm devices are a function of the intensity of the current which passes through the connection between the common point and earth. As, for a given value of fault, this current is proportional to the voltage of the network, it will be appreciated that a variation of voltage results in a variation of the indication of the value of insulation resistance. In certain cases, the variation is sufficiently great to alter considerably the indications of the value of insulation resistance given by the apparatus.

The object of the present invention is concerned with a method and the devices applying the said method, which make it possible to obtain a measurement of the insulation resistance and a faithful transmission of this measurement to a distance, irrespective of the variations of voltage of the network, and which is unaffected by the characteristics of the line employed for the transmission.

The method according to the invention consists of causing a polarized current to circulate in an electrical connection between the phases of the network and earth, of deriving a voltage from the said connection, of utilizing the said voltage to fix the final discharge voltage of a condenser, the charging of which is effected by a voltage proportional to the network voltage, and of measuring the time of discharge of the said condenser as a function of the insulation resistance of the network.

In accordance with an improved alternative form of embodiment, the method consists of inserting the above-mentioned condenser in a relaxation circuit and of measuring the relaxation frequency of the said circuit as a function of the insulation resistance of the network.

The device according to the invention comprises an electronic circuit in which a condenser is alternately put into connection, on the one hand with the network, in such manner that it can be charged to a polarized voltage proportional to that of the network, and on the other hand with a resistance in series with a polarized electrical connection between the phases of the network and earth.

According to one preferred form of construction, the electronic circuit is a multi-vibrator in which the two condensers adapted to be charged and discharged successively, are arranged in such manner that they are charged alternately at a polarized voltage proportional to that of the network and are discharged to a voltage proportional to the current which circulates in a polarized electrical connection between the phases of the network and earth.

According to a further characteristic feature, the multi-vibrator is constructed with semi-conductor elements.

It follows from the features recited above that the invention offers, amongst others, the following advantages:

For a given voltage of the network, the time of discharge of the condenser or the frequency delivered by the relaxation circuit are a function of the intensity of the current which circulates in the polarized connection between the phases of the network and earth, this current being, as is well known per se, a function of the insulation condition of the network. As will be explained later, variations of voltage of the network do not modify the discharge time of the condenser or the frequency generated by the relaxation circuit, for a given value of insulation resistance.

Finally, the discharge time of the condenser or the frequency generated by the relaxation circuit are a function of the condition of the insulation of the network, irrespective of the voltage.

A further very important advantage of the improved alternative method according to the invention, resides in that there is obtained a measurement of the insulation resistance in the form of a frequency signal; a signal of this kind is very easy to measure in situ or at a distance and this measurement can be effected with accuracy and reliability.

Other characteristics, advantages and particular features of the invention will become apparent from the description which follows below with reference to the accompanying drawings, in which.

Figure 1:
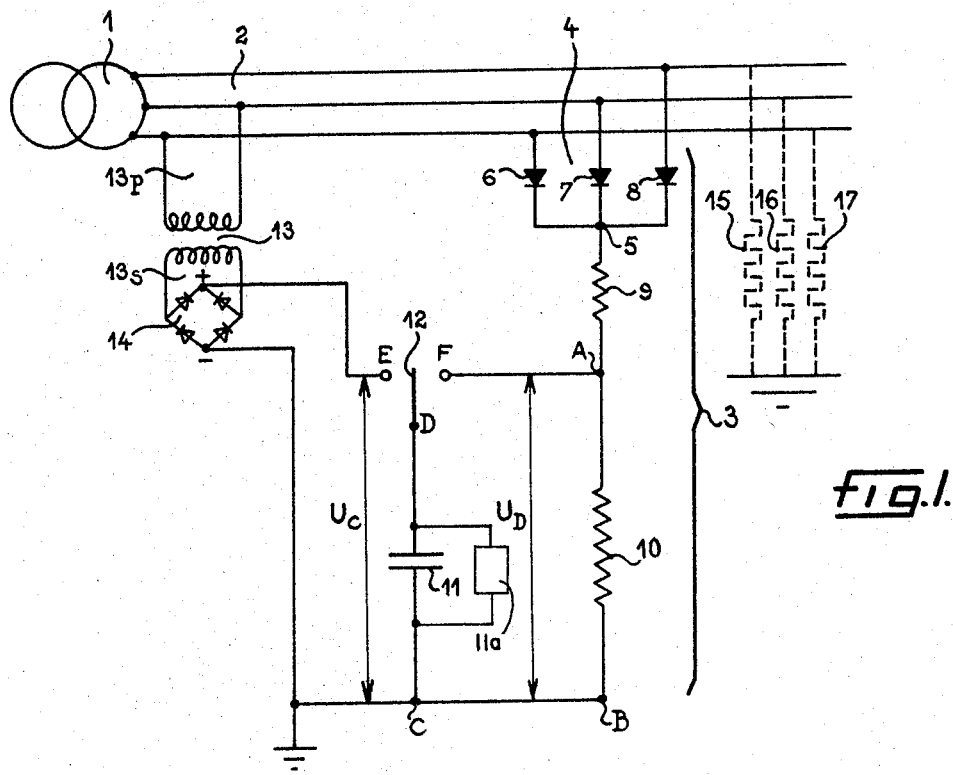
FIG. 1 is the basic diagram of the method of measurement of insulation resistance to earth of electrical networks, in accordance with the invention.

In FIG. 1, the reference 1 represents the power transformer supplying the electrical network 2, in the present case a three-phase network with insulated neutral, of which it is desired to measure the value of the insulation resistance with respect to earth.

The measuring or insulating checking device proper comprises essentially an electrical connection between the conductors of the phases of the network 2 and earth. This electrical connection is represented by the general reference 3, is constituted by a star 4 with three arms connecting the three phases of the network to a common point 5, each of the arms of the star including a semi-conductor element 6, 7, 8.

Figure 2:
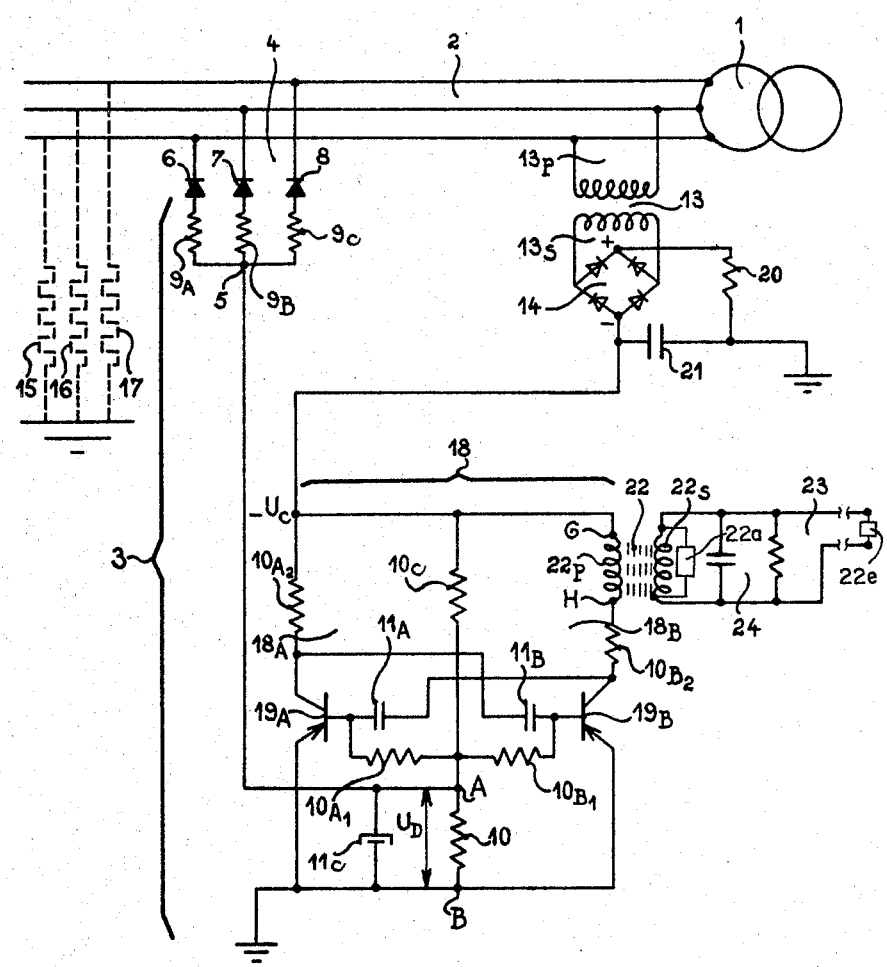
FIG. 2 is a possible diagram with an electronic circuit of a device for measuring insulation resistance employing the method according to the invention.

In order to limit the intensity of the polarized current which flows in the connection 3 in the event of an insulation fault, a resistance is connected in 3 of high value, either at 9, that is to say on the downstream side of the common point 5, as shown in FIG. 1, or at $9_A$, $9_B$, $9_C$, in each of the arms of the star 4, that is to say on the upstream side of the common point 5, as shown in FIG. 2.

The electrical coupling 3 comprises a resistance 10, at the terminals A, B of which is derived a voltage $U_D$ which is proportional to the intensity of the current which flows in the event of an insulation fault.

According to an essential characteristic feature of the invention, which will be referred to in more detail later, this voltage $U_D$ is utilized to fix the voltage of the end of discharge of a condenser 11, of which one of the terminals C is connected to earth while the other terminal D is connected to a contactor 12, mechanical, electronic, etc.

According to the method of the invention, the charge of the condenser 11 is effected by a voltage $U_c$ proportional to the voltage of the network 2.

This voltage $U_c$ is obtained for example by means of a transformer 13, the primary $13_p$ of which is connected between two phases of the network 2 while the secondary $13_s$ supplies one of the diagonals of a rectifier bridge 14, the other diagonal of the said bridge being connected on the one hand to the terminal C of the condenser 11 and, on the other hand, to the terminal E of the contactor 12.

When the network 2 is under tension, a current is produced in the coupling 3, between the common point 5 and earth, this current being the sum of the currents which pass through the semi-conductor elements 6, 7 and 8, and eventually the resistances $9_A$, $9_B$, and $9_C$ (FIG. 2).

The circuit of this current is closed through the intermediary of the insulation resistances of the three phases of the network 2, which have been represented diagrammatically by three resistances in dotted lines 15, 16 and 17, between phases and earth. The fault current varies inversely with the value of the said insulation resistances.

The principle of the method of measurement or checking of insulation resistance according to the invention, which results from examination of FIG. 1, is as follows:

In a first phase, the contactor 12 is closed in the position D–E, which has the result of charging the condenser 11 to a voltage $U_c$ proportional to that of the network 2.

In a second phase, the contactor 12 is closed in the position D–F, which has the result of discharging the condenser 11 into the resistance 10 down to a voltage $U_D$ proportional to the intensity of the fault current. The discharge time then only depends on the ratio of $U_D$ and $U_c$. Since the fault current in turn varies proportionally to the voltage of the network, it can be seen that the ratio $U_D:U_c$ becomes independent of the charging voltage $U_c$ and depends only on the fault resistance.

In other words, it is seen that the discharge time of the condenser 11, which constitutes the measurement quantity, is a function of the current circulating between the three phases of the network and earth, and is independent of the fluctuations of the network voltage.

In accordance with the invention, this time of discharge, which is a function of the insulation resistance of the network, can either be read directly, for example by a measuring device indicated at 11a which may be any apparatus enabling a quantity of electricity to be measured such as a ballistic galvanometer or any other conventional system enabling the discharge time of a condenser to be measured directly, or transformed for the convenience of measurement or transmission, into another quantity such as frequency, voltage etc., by means of appropriate devices.

In this latter case, the condenser 11 is inserted in a relaxation circuit and the relaxation frequency of the said circuit is measured as a function of the insulation resistance of the network.

According to a preferred form of embodiment shown by way of example in FIG. 2, an electronic circuit is employed constituted by a multi-vibrator, the two condensors of which are arranged so that, as in the case of FIG. 1, they are alternately charged to a polarized voltage proportional to that of the network and are discharged to a voltage proportional to the current which circulates in the polarized electrical coupling between the phases of the network and earth.

In order to avoid useless complication of the description, the electrical elements identical with those of FIG. 1 will not be described again, and the said elements will be designated in FIG. 2 by the same references as those utilized in FIG. 1.

The multi-vibrator designated by the general reference 18 comprises in the usual manner two arms $18_A$ and $18_B$, which are caused to play, at each half-period of its operation, the part of the resistance-capacity circuit 10–11 of FIG. 1. To this end, the said arms comprise: the capacities $11_A$ and $11_B$, the transistors $19_A$ and $19_B$ and the discharge resistances $10_{A1}$ and $10_{A2}$, $10_{B1}$ and $10_{B2}$. As can be seen from FIG. 2, the multi-vibrator is supplied between the two terminals of the output diagonal of the rectifier bridge 14 through the intermediary of a resistance capacity filter 20–21, the point of connection between the capacity 21 and the resistance 20 being connected to earth. The resistance $10_C$ and the resistance 10 form a dividing bridge which fixes the polarization of the bases of the transistors. The capacity $11_C$ ensures the filtration of the voltage which appears in the event of fault between A and B. On the other hand, the resistances $10_{A2}$ and $10_{B2}$ are respectively connected in series in the collector circuit of the transistors $19_A$ and $19_B$, while the discharge resistances $10_{A1}$ and $10_{B1}$ provide the connection between the base of the transistors $19_A$ and $19_B$ and the terminal A of the resistance 10 mounted in series in the phase-earth coupling 3. It is from the terminals A–B of this resistance that there is derived the voltage $U_D$ proportional to the intensity of the fault current and serving to fix the end of discharge voltage of the capacities $11_A$ and $11_B$.

The multi-vibrator supplies at its output terminals G, H a voltage of rectangular wave-form created by the successive blocking and releasing of its two transistors $19_A$ and $19_B$. The repetition frequency of these changes of state is fixed by the duration of charge or of discharge of the two capacities $11_A$ and $11_B$. These capacities are charged one after the other to the supply voltage $U_c$ of the circuit, which is proportional to the voltage of the network 2. At each half-period, at the moment when the corresponding transistor becomes conductive, one of the capacities discharges, so that the potential difference at its terminals becomes equal to the voltage $U_D$ which exists at the terminals A, B of the resistance 10, this voltage being in turn proportional to the fault current and thus to the value of the insulation resistance of the network. It can thus be seen that when this voltage $U_D$ increases, the time necessary to reach the release voltage of the transistor concerned is reduced and the frequency of the square-top signals also increases.

Figure 3:
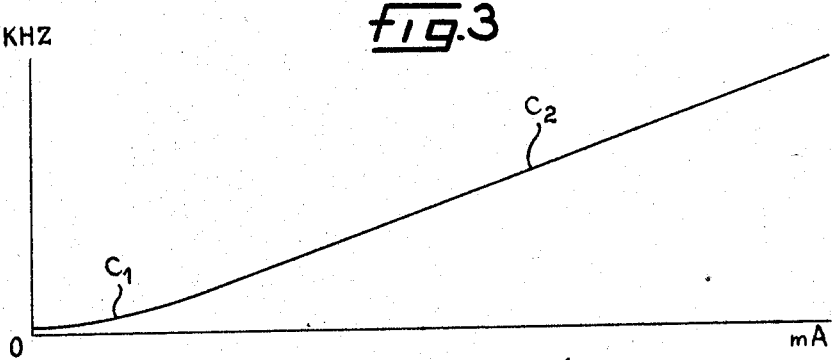
FIG. 3 is an explanatory diagram of the operation of the device shown in FIG. 2.

There has been shown in FIG. 3 the general form of the curve of variation of frequency of the square-top signals at the output of the multi-vibrator as a function of the variation of the fault current in the resistance 10. Tests carried out by the applicant have shown that only the initial portion $C_1$ of this curve is fairly flat, and this has no importance since this portion of the curve corresponds to good insulation resistances, whereas the portion $C_2$ of the same curve, corresponding to less good and bad insulation resistances, has on the contrary a high slope.

Another very important advantage of this preferred form of embodiment of the invention resides in that there is obtained a measurement of the insulation resistance of the network in the form of a frequency signal which is very easy to measure in situ or at a distance, and this measurement can be made with accuracy and reliability.

In the case where it is desired to measure the frequency signal at a distance, it is in fact only necessary to connect to the output terminals G and H of the multi-vibrator 18, the primary $22_p$ of a transformer 22, the secondary $22_s$ of which is connected to a transmission line 23, which may be a line already existing in the installation. A filter 24 is of course connected to the terminals of the secondary 22ₛ of the transformer 22. Any known pulse frequency meter 22a across secondary 22ₛ or 22ₑ at a distance may be used to measure the relaxation frequency.

Thus, in particular, it is possible to employ telephone cables as the transmission line, the only condition necessary in this case being that of utilizing an ultrasonic frequency.

The tests carried out by the applicant have proved furthermore that the frequency supplied by the multivibrator practically depends only on the value of the insulation resistance of the network and is relatively unaffected by fluctuations of the voltage of the network.

Thus, in the case of excellent insulation resistances, there has been observed a variation of frequency of 2% for a variation of 20% in the voltage of the network and that in the case of bad insulation resistances, the frequency variation did not exceed 0.5% for a variation of 20% in the network voltage.

It will of course be understood that the invention has only been described and illustrated in a purely explanatory way and not in any limitative sense, and that modifications of detail may be made thereto without thereby departing from the scope of the said invention.

Thus, in particular, the invention can be applied equally well to the supervision of single-phase networks and to that of three-phase networks, as shown in FIGS. 1 and 2. The only difference is that, in the case of single-phase networks, the network-earth coupling is double instead of being triple.

I claim:

1. A method of measuring the insulation resistance to earth of an alternating electrical network with an insulated neutral permitting a faithful indication to be obtained which can be transmitted to a distance, irrespective of the variations of voltage of said network, said method consisting of:

supplying at the terminals of a first circuit a voltage proportional to the voltage of said network;

causing a polarized current to flow in an electrical coupling circuit between the phases of the network and earth;

deriving from said coupling circuit a voltage proportional to the current flowing in said coupling circuit and supplying said voltage to the terminals of a second circuit;

connecting a condenser to the terminals of said first circuit and charging said condenser to the value of the voltage proportional to the network voltage;

connecting said condenser to the terminals of said second circuit and discharging said condenser to the value of the voltage proportional to that of the current flowing in the polarized coupling circuit between the phases of the network and earth;

measuring the time taken for the condenser to discharge into said second circuit;

and utilizing the discharge time of said condenser as a function of the insulation resistance of the network.

2. A method of measurement as claimed in claim 1, in which the condenser is inserted in a relaxation circuit and adjusts the relaxation frequency of said circuit which is measured as a function of the insulation resistance of said network.

3. A method of measuring the insulation resistance to earth of an alternating electrical network with an insulated neutral, said method consisting of:

supplying at the terminals of a first circuit a voltage proportional to the voltage of the network;

causing a polarized current to flow in an electrical coupling circuit between the phases of said network and earth;

deriving from said coupling circuit a voltage proportional to the current flowing in said coupling circuit and supplying said voltage to the terminals of a second circuit;

inserting a condenser in a relaxation circuit connected in turn, on the one hand to the terminals of said first circuit delivering the voltage proportional to that of the network and, on the other hand, to the terminals of said second circuit delivering the voltage proportional to the current flowing in the coupling circuit between the phases of the network and earth;

and measuring the relaxation frequency of said relaxation circuit as a function of the insulation resistance of said network.

4. A method of measurement as claimed in claim 3, in which the frequency signal of said relaxation circuit is transmitted by a circuit permitting the reading of said frequency at a distance, as a function of the insulation resistance of said network.

5. Apparatus for the measurement of the insulation resistance to earth of an alternating electrical network with an insulated neutral, said appratus comprising, in combination:

means for supplying a polarized voltage proportional to the voltage of said network;

a polarized electric coupling circuit between the phases of said network and earth, said coupling circuit comprising a common point connection of the phases and a resistance connected in series with said common point connection;

means for deriving from the terminals of said resistance, a polarized voltage proportional to the current flowing in said polarized coupling circuit between the phases of the network and earth;

an electronic circuit comprising at least one condenser;

means for connecting said condenser and for charging the same from the terminals of the circuit supplying the polarized voltage proportional to that of said network;

means for connecting said condenser and for discharging said condenser at the terminals of the circuit supplying the polarized voltage proportional to the current flowing in said polarized coupling circuit between the phases of the network and earth;

and means for measuring the discharge time of said condenser as a function of the insulation resistance of said network.

6. Measuring apparatus as claimed in claim 5, in which said electronic circuit is constituted by a multi-vibrator with two condensers which are alternately charged to the polarized voltage proportional to that of the network and are discharged to a voltage proportional to the current flowing in the polarized coupling circuit between the phases of the network and earth, means being provided for measuring the relaxation frequency of said multivibrator as a function of the insulation resistance of said network.

7. Apparatus for measuring the insulation resistance to earth of an alternating electrical network with an insulated neutral, said apparatus comprising in combination:

a first circuit supplying a polarized voltage proportional to the voltage of said network;

a polarized electric coupling circuit between the phases of the network and earth, said coupling circuit comprising a common point connection of the phases and a resistance connected in series with said common point connection;

a second circuit means connected to the terminals of said resistance and supplying a polarized voltage proportional to the current flowing in said polarized coupling circuit between the phases of the network and earth;

a multi-vibrator with two condensers and with its input connected between a terminal of said first circuit and earth and to said resistance;

and means for measuring the relaxation frequency of said multi-vibrator as a function of the insulation resistance of said network connected to the output of said multi-vibrator.

8. Measuring apparatus as claimed in claim 7, in which the frequency signal of said multi-vibrator is injected into the primary of a transformer, the secondary of which is connected to the terminals of a transmission line, means for measuring the frequency as a function of the insulation resistance of the network being provided at the output terminals of said transmission line.

References Cited by the Examiner

UNITED STATES PATENTS 3,158,785  11/1964  Gagniere et al. _____ 317—18

FOREIGN PATENTS 657,057  2/1963  Canada.

RUDOLPH V. ROLINEC, *Primary Examiner.*

WALTER L. CARLSON, *Examiner.*

G. R. STRECKER, *Assistant Examiner.*